(12) United States Patent
Mayo

(10) Patent No.: US 8,342,545 B2
(45) Date of Patent: Jan. 1, 2013

(54) MOBILE CART FOR METAL DECKING SHEETS

(76) Inventor: John Leighton Mayo, Penn Valley, CA (US)

( * ) Notice: Subject to any disclaimer, the term of this patent is extended or adjusted under 35 U.S.C. 154(b) by 25 days.

(21) Appl. No.: 12/932,976

(22) Filed: Mar. 9, 2011

(65) Prior Publication Data

US 2012/0228844 A1 Sep. 13, 2012

(51) Int. Cl.
*B62B 5/00* (2006.01)
(52) U.S. Cl. .................................................. 280/79.7
(58) Field of Classification Search ............... 280/79.7, 280/79.11, 79.3, 408; 414/10, 12, 498, 11; 212/325
See application file for complete search history.

(56) References Cited

U.S. PATENT DOCUMENTS

| | | | | |
|---|---|---|---|---|
| 1,569,971 A * | 1/1926 | Pittman | ...................... | 280/79.11 |
| 2,397,317 A * | 3/1946 | Hulbert et al. | ................. | 280/641 |
| 2,466,149 A * | 4/1949 | Burg | ............................. | 280/79.7 |
| 2,514,308 A * | 7/1950 | Burg | ............................. | 280/79.3 |
| 2,681,233 A * | 6/1954 | Smith | ........................... | 280/79.7 |
| 2,851,279 A * | 9/1958 | Burg et al. | ................. | 280/79.11 |
| 3,003,788 A * | 10/1961 | Grymer | ........................... | 410/38 |
| 3,138,265 A * | 6/1964 | Hansen | ........................... | 414/428 |
| 3,643,935 A * | 2/1972 | Bell | .............................. | 269/16 |
| 3,698,577 A * | 10/1972 | Dean | .............................. | 414/343 |
| 3,758,067 A * | 9/1973 | Kleiber | ......................... | 249/129 |
| 3,825,087 A * | 7/1974 | Wilson | ......................... | 180/6.48 |
| 4,326,726 A * | 4/1982 | Dunchock | ..................... | 280/79.3 |
| 4,360,211 A * | 11/1982 | Blake | ............................. | 280/79.7 |
| 4,421,242 A * | 12/1983 | Brueske | ......................... | 212/325 |
| D288,739 S * | 3/1987 | Johnson et al. | ................. | D34/17 |
| 4,650,392 A * | 3/1987 | Casteel | .......................... | 414/680 |
| 4,867,465 A * | 9/1989 | Dunchock | ..................... | 280/79.3 |
| 5,253,887 A * | 10/1993 | Marenger | ..................... | 280/79.3 |
| 5,640,215 A * | 6/1997 | Catta | .............................. | 348/789 |
| 5,762,348 A * | 6/1998 | Echternacht | ................. | 280/79.7 |
| 5,927,514 A * | 7/1999 | Linder | ........................... | 211/26 |
| 6,032,966 A * | 3/2000 | Young | .......................... | 280/79.7 |
| 6,234,432 B1 * | 5/2001 | Piller et al. | .................... | 248/129 |
| 6,579,051 B2 * | 6/2003 | Echternacht | .................... | 414/11 |
| 6,729,632 B2 * | 5/2004 | Ferrigan | ...................... | 280/79.7 |
| 6,857,836 B2 * | 2/2005 | Keller | ............................. | 414/11 |
| 6,866,463 B2 * | 3/2005 | Riordan et al. | .............. | 414/498 |
| 7,207,578 B2 * | 4/2007 | Shore | ........................... | 280/79.7 |
| 7,325,816 B2 * | 2/2008 | Johnson | ....................... | 280/79.4 |
| 7,806,646 B2 * | 10/2010 | Riordan et al. | ............. | 414/498 |
| 8,104,787 B2 * | 1/2012 | Haley | ............................. | 280/639 |
| 2001/0016156 A1 * | 8/2001 | Echternacht | .................... | 414/11 |
| 2002/0044853 A1 * | 4/2002 | Keller | ............................ | 414/11 |
| 2003/0015115 A1 * | 1/2003 | Lamb et al. | ................... | 104/282 |
| 2003/0190219 A1 * | 10/2003 | Young | ............................. | 414/11 |
| 2004/0007839 A1 * | 1/2004 | Ferrigan | ...................... | 280/79.7 |
| 2005/0040618 A1 * | 2/2005 | Beatty | .......................... | 280/79.3 |
| 2006/0005765 A1 * | 1/2006 | Davidson | ...................... | 118/323 |
| 2006/0087092 A1 * | 4/2006 | Chubb | ........................ | 280/79.11 |

(Continued)

*Primary Examiner* — Katy M Ebner
*Assistant Examiner* — Brodie Follman
(74) *Attorney, Agent, or Firm* — Mark C. Jacobs

(57) ABSTRACT

A forward moving powered cart configured to receive a bundle of roof decking sheets, and which cart rides on the each of three spaced adjacent trusses after being crane lifted onto the said roof trusses. The cart has two sets of spaced casters that ride on the $1^{st}$ and $3^{rd}$ truss, while a safety truck on the cart designed to prevent slippage from the two trusses upon which its two sets of casters ride, engages the middle truss of the three. Sheets are removed from the rear for placement and post installation, the cart is moved forwardly an incremental amount.

15 Claims, 12 Drawing Sheets

U.S. PATENT DOCUMENTS

| | | |
|---|---|---|
| 2006/0197298 A1* | 9/2006 | Shore ............................ 280/79.7 |
| 2007/0216119 A1* | 9/2007 | Cosgrove ..................... 280/79.7 |
| 2008/0012260 A1* | 1/2008 | Ouyang et al. ............. 280/79.11 |
| 2008/0272564 A1* | 11/2008 | Fitzgerald et al. ......... 280/47.34 |
| 2009/0096144 A1* | 4/2009 | White ............................. 269/17 |
| 2009/0101742 A1* | 4/2009 | Chadwick ..................... 242/131 |
| 2009/0179395 A1* | 7/2009 | Morris et al. ............... 280/79.11 |
| 2010/0059952 A1* | 3/2010 | Haley ........................... 280/79.7 |
| 2011/0120048 A1* | 5/2011 | Perry ........................... 52/745.2 |
| 2011/0133419 A1* | 6/2011 | Takehara et al. ............. 280/79.3 |
| 2011/0217150 A1* | 9/2011 | Takehara et al. ............... 414/392 |

\* cited by examiner

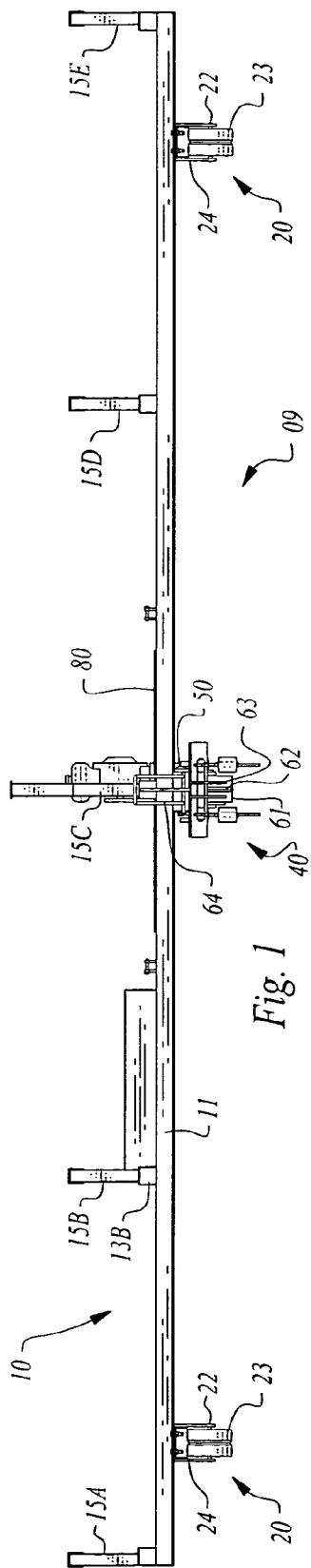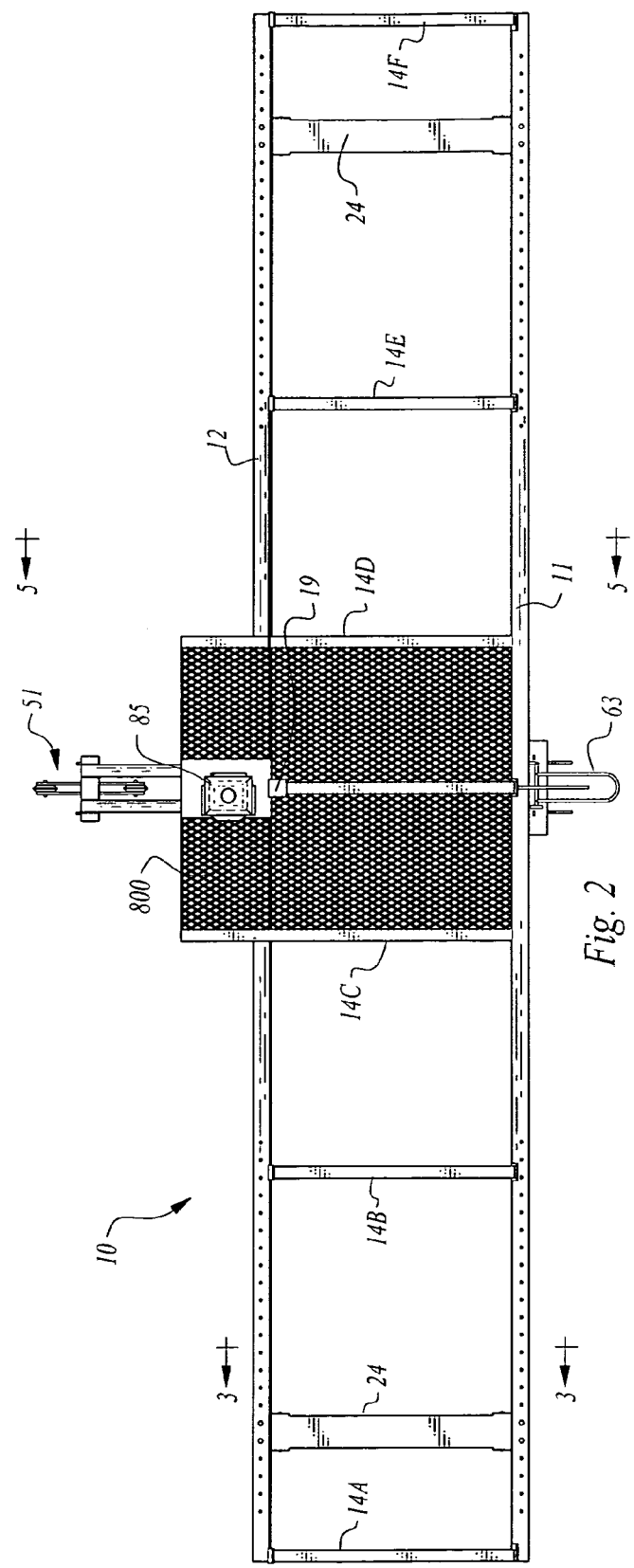

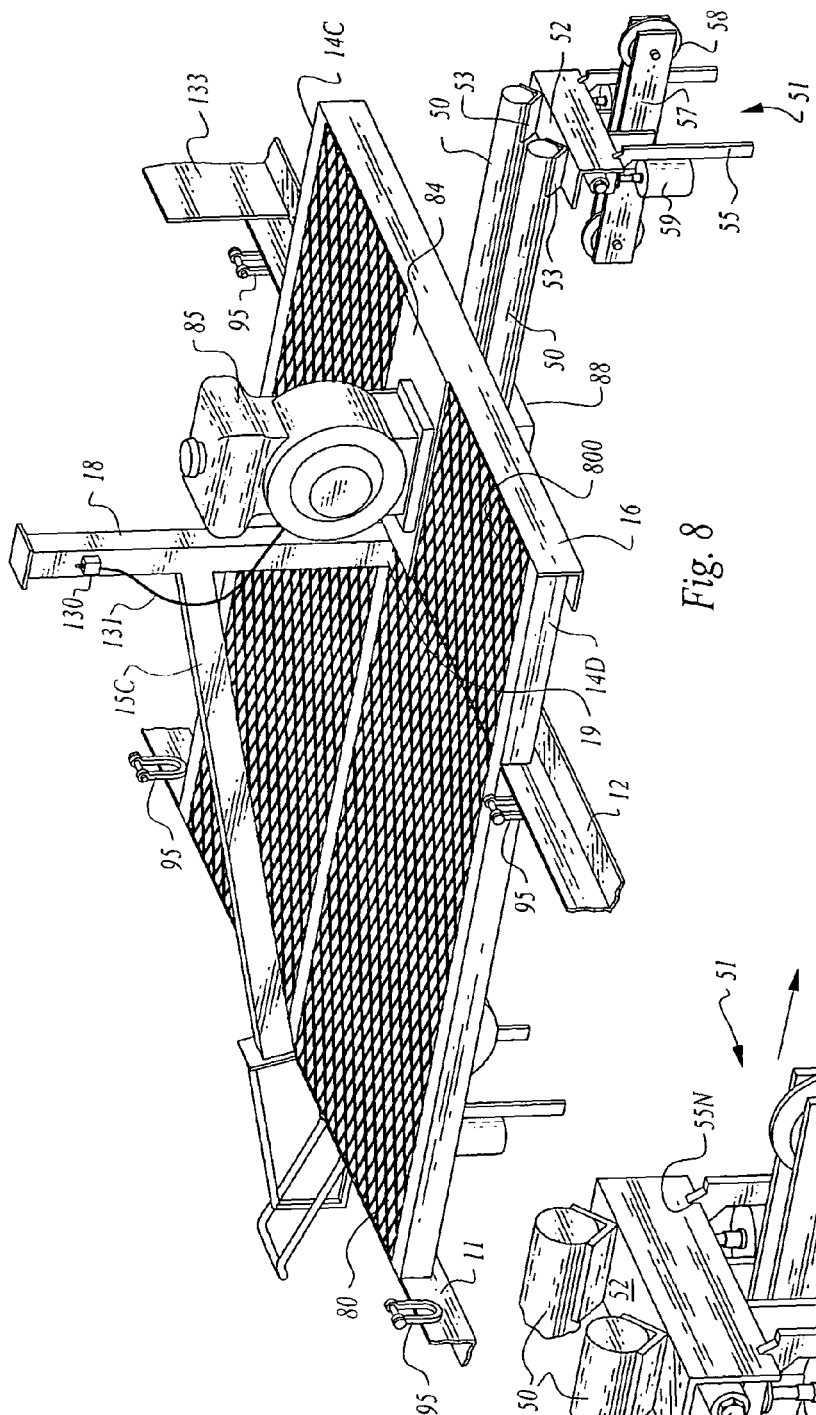
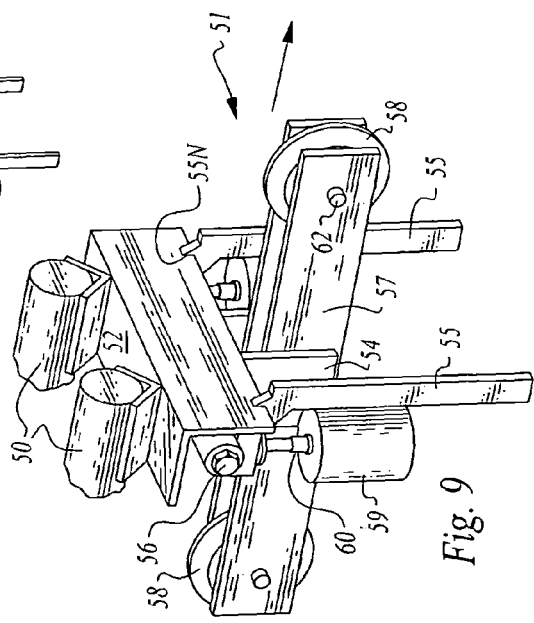

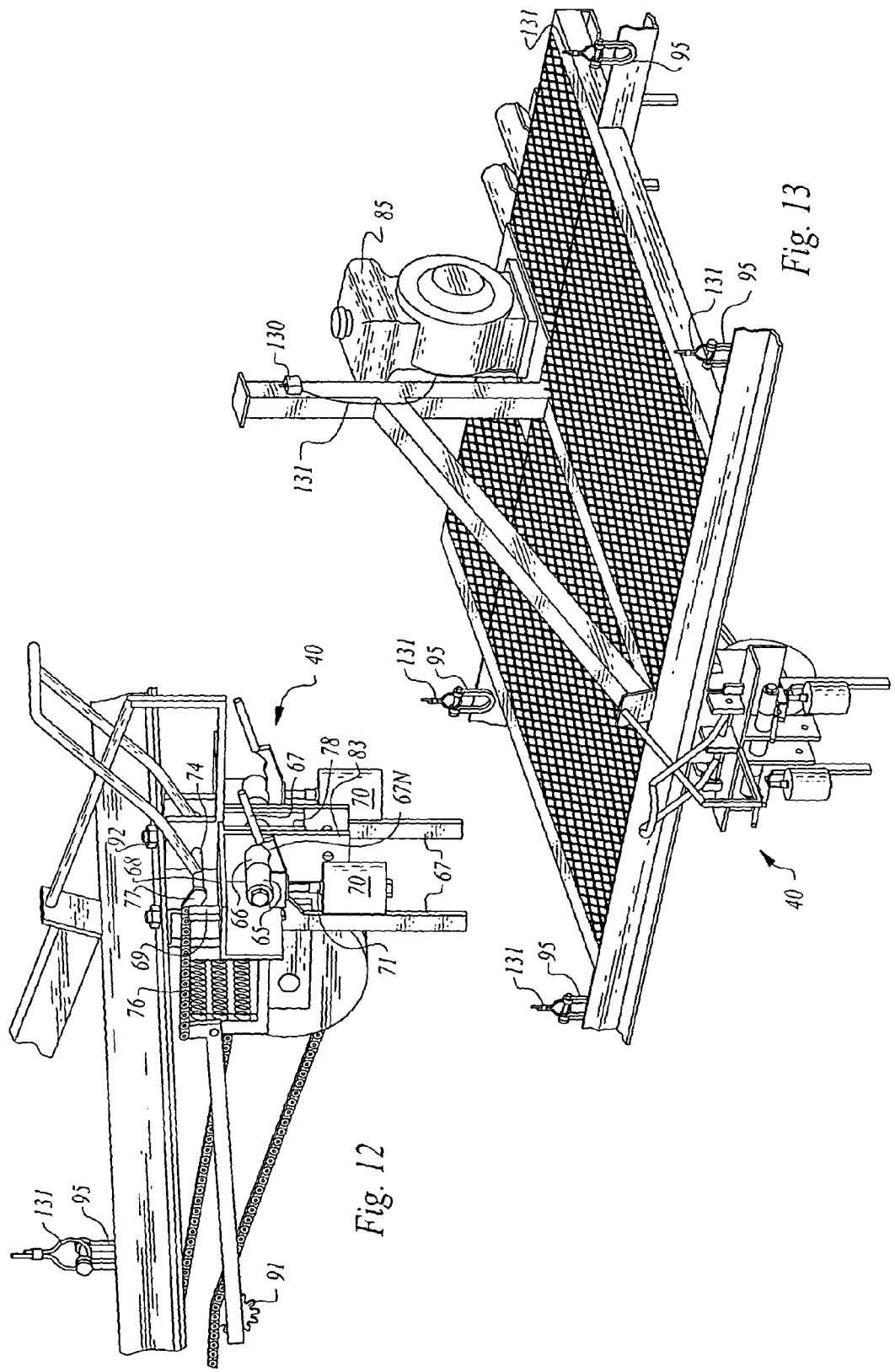

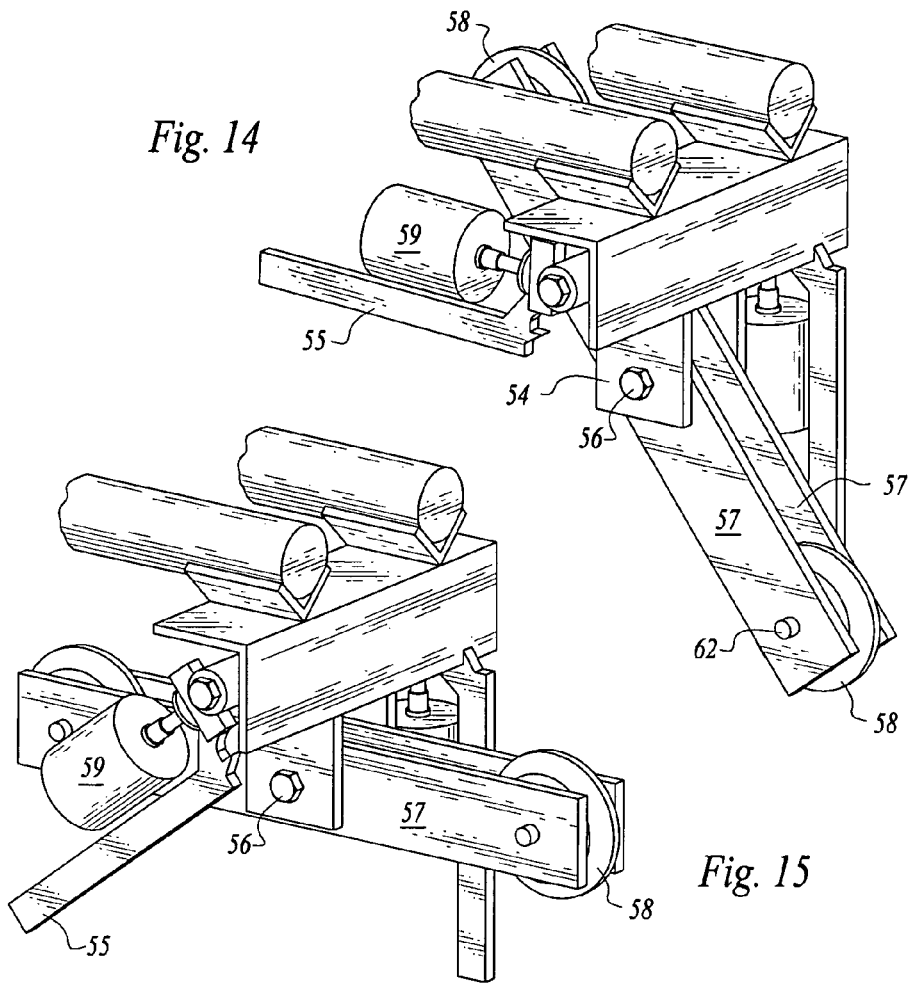
*Fig. 14*
*Fig. 15*
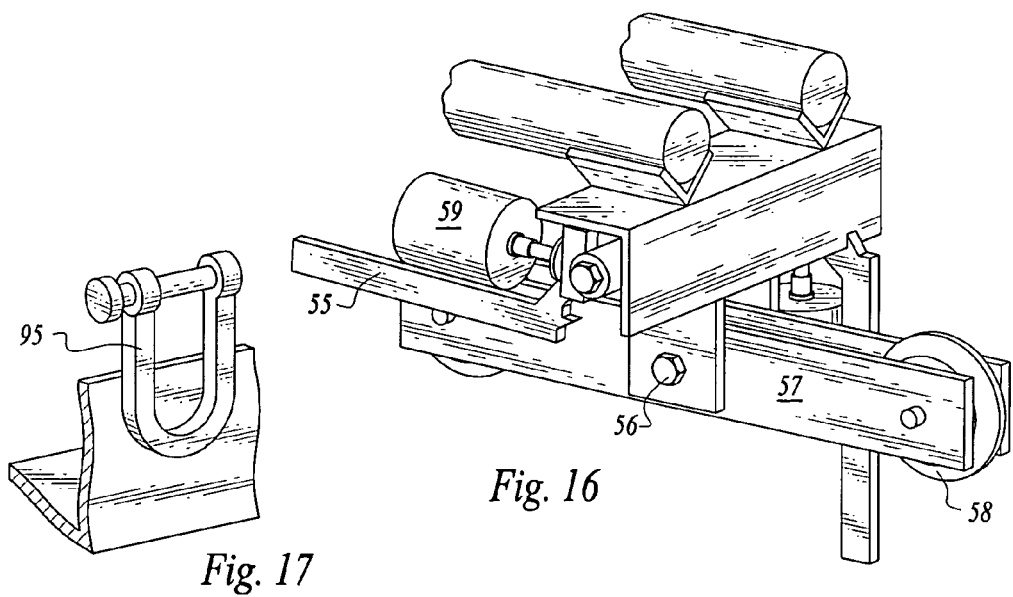
*Fig. 16*
*Fig. 17*

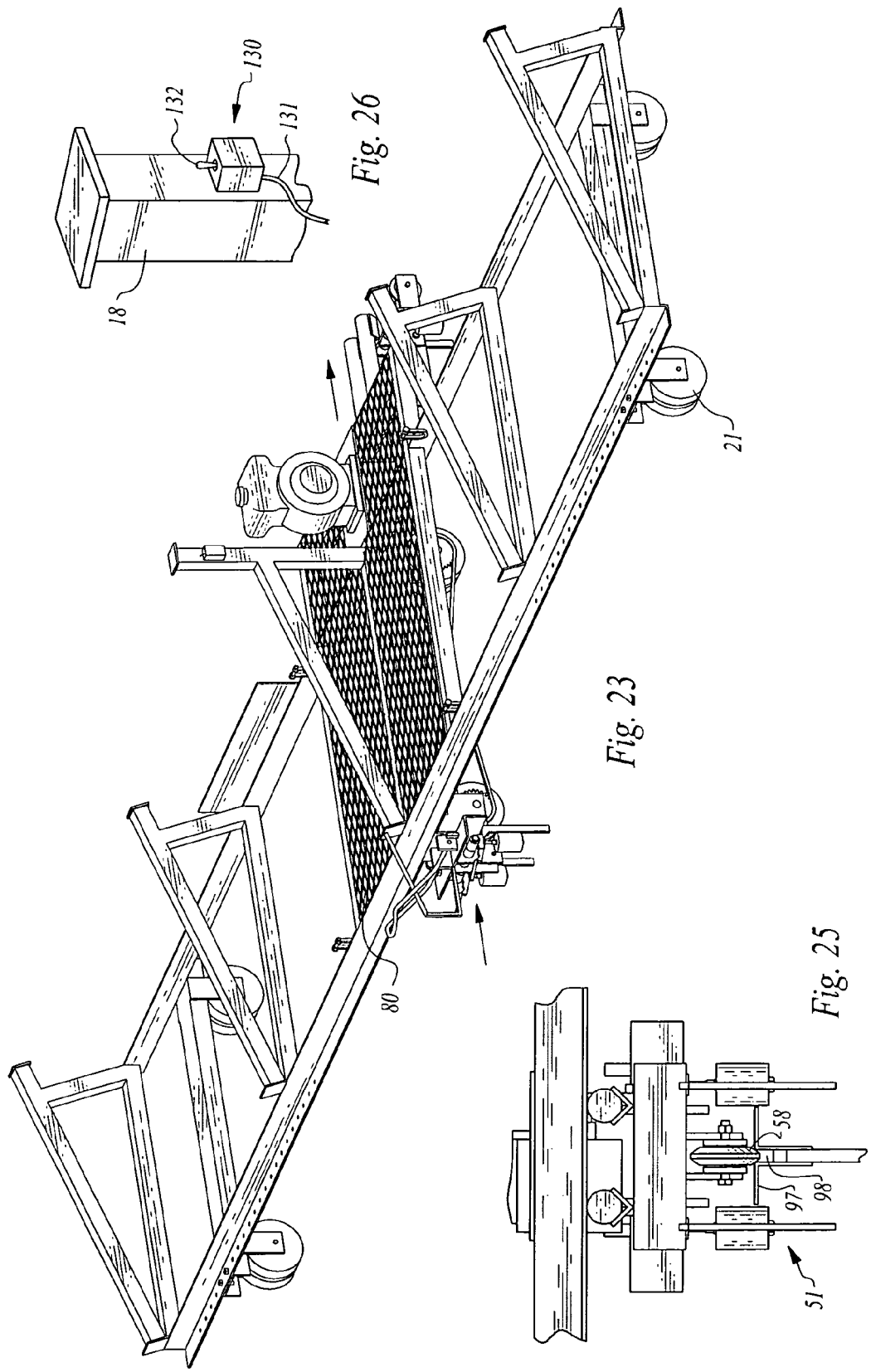

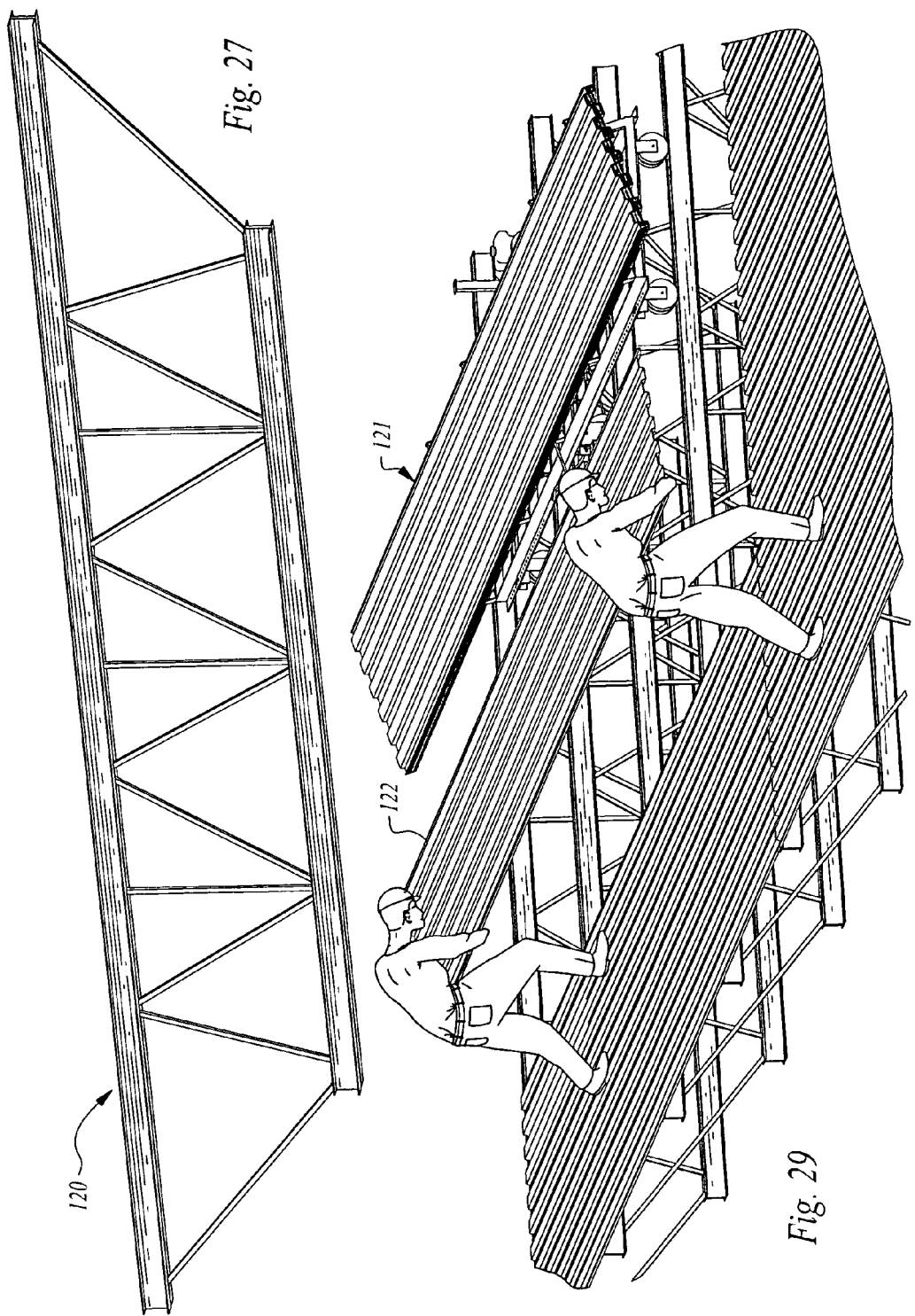

X=LOCATION PLACEMENT OF ONE DECKING SHEET

EASY STEP = PLACEMENT OF EACH OF 5 SHEETS OF DECKING AT EACH STEP OF CURVE ON THREE TRUSSES

X=REPRESENTS PLACEMENT OF ONE DECKING SHEET

WALK PATTERN ALONG TRUSS TO PLACE ACCESS SHEETS ON ONE SET OF THREE TRUSSES

MOBILE CART FOR METAL DECKING SHEETS

FIELD OF INVENTION

This invention pertains to a cart for retaining a bundle of metal decking sheets on a rooftop for removal and installation by a work crew.

BACKGROUND OF THE INVENTION

When tilt up concrete wall buildings and other large commercial structures are built with flat roofs, the roof trusses are spaced from 8 TO 10 feet apart. The roof type often used for placement on the trusses of these buildings are large sheets of steel, 3 feet wide×32-40 feet long.

Bundles of 12 or more of these sheets banded together, are hoisted by a crane and placed across a multitude of spaced trusses. Then, according to the conventional technique, each sheet, subsequent to unbundling is moved by a plurality of workers from the pile to the first and subsequent locations adjacent to and in line with the bottom decking member to the particular set of trusses, upon which the pile rests. Then installation transpires as the bundle remains in a static location.

On a major building of 100,000 sq foot roof area, thousands of steps are taken by the men and women who lift those 200-300 pound sheets of steel and move each sheet from the pile a distance ranging from three to thirty-six feet from the start point. Such steps amount to huge expenditures just to place the decking members in position for attachment to the trusses.

In contrast, workers who utilize the cart of this invention, merely remove a sheet from the rear of the cart install it and move the cart forwardly. There walking pattern is significantly reduced because the cart moves with the bundle from the width of a sheet to the next location another sheet width forward. The invention of this application when used by the workers, will cut the labor cost of laying a steel sheet roof by between 70% and 80%, as contrasted to the hand carry mode used today due to less time spent between sheet installs.

SUMMARY OF THE INVENTION

A 4 wheeled powered cart configured to receive a bundle of metal decking sheets, and which cart is adapted to ride on the each of three spaced adjacent trusses is lifted by a crane onto three spaced roof trusses. The cart has two sets of spaced casters that ride on the $1^{st}$ and $3^{rd}$ truss, safety means on the cart designed to prevent slippage from the two trusses upon which its two sets of casters ride engages the middle truss of the three.

The cart moves forward upon the actuation of the controls of a pneumatic, hydraulic or electric motor. A plurality of sheets of decking, each about the same width as the cart, are stored on an inclined plane, known as the DRS or decking receiving surface, abutting an upstanding rest, for individual removal as needed. A sheet of conventional decking is removed from the pile by the work crew and placed on the trio of trusses between the last most sheet placed on the trusses and the cart. The cart is then moved forward, the equivalent of one width of decking. By such operation the decking layer persons only walk forward. When the cart is empty, the crane on site moves a new pile onto the cart, and after which the deck layer persons commence removing sheets from the new pile of decking sheets until the job is completed.

As seen in the figures, the cart has 8 non-pivoting casters in 2 sets of 2 abutting front and 2 abutting rear casters, beneath a super structure having an expanse wider than the caster sets, a control system for forward movement, an inclined decking receiving surface, and safety retention means to keep the cart aligned such that it does not stray from the spaced trusses upon which it has been set by a crane's boom.

The invention accordingly comprises the apparatus which possesses the features, properties, and the selection of components which are amplified in the following detailed disclosure, and the scope of the application of which will be indicated in the appended claims.

BRIEF DESCRIPTION OF THE FIGURES

FIG. 1 is a rear elevational view of this invention.
FIG. 2 is aa top plan view thereof.
FIG. 8 is a top rear perspective view of the engine area of this invention.
FIG. 9 is a closeup view of the front guide assembly.
FIG. 12 is a left closeup view of the guide means and the actuator of the invention.
FIG. 13 is a top right perspective view of the center portion of this invention.
FIG. 14 is a closeup view of a tilted front truck.
FIG. 15 is a closeup view of a rear guide roller & pivot bar partially raised.
FIG. 16 is a closeup view of a rear guide roller and pivot bar fully raised.
FIG. 17 is a closeup view of a cleat or hitch point for relocation of the apparatus.
FIG. 23 is a front right perspective view of the apparatus.
FIG. 25 is a diagrammatic view showing how a truck engages a truss to keep the apparatus going straight on its course.
FIG. 26 is a perspective view of the emergency stop means if the actuator fails to work.
FIG. 27 is a side elevational view of a single roof truss.
FIG. 29 shows 2 men removing one sheet from a bundle of such sheets disposed on the cart of this invention.

DESCRIPTION OF THE PREFERRED EMBODIMENT

Figure 3:
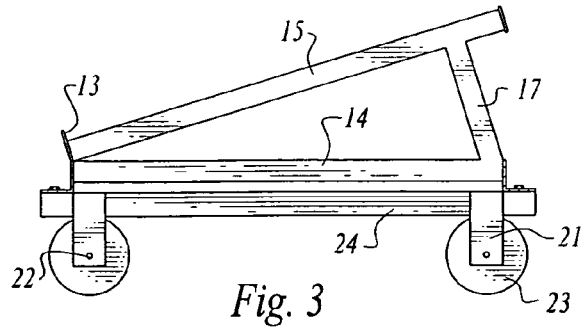
FIG. 3 is a right end sectional view of the apparatus.

In FIG. 1 a rear elevational view of the apparatus is seen. The apparatus 09 has a superstructure 10 which includes an elongated L-beam 11, designated the rear base spaced from a mirror image front L-beam of similar length as seen in FIG. 2 and designated 12, the front base. The base of both beams 11 and 12 face outwardly. These are connected by a cross members 14A,14B,14C,14D,14E and 14F. Disposed between 14A and 14b and disposed between 14E AND 14F are inverted U-channels 24 which as will be discussed carry sets of casters as will be discussed infra. Now turning to FIG. 3 it is seen that at each end, here the left end, connected to the cross member 14 is an inclined member 17 which is disposed at about a 63 degree angle. This is determined from the fact that inclined member 17 abuts the DRS 15 at a 90 degree angle while the inclination of DRS 15 is set at about 17 degrees. The sum of 17,63 and 90=180, the area of a triangle. At the lower end of each DRS is a stop or foot whose 1.3 elevation is greater than the DRS such as to retain the bundle of sheets of decking. These DRSs are designated 15A-15E. There are 5 of these, but six cross members 14. See FIG. 1, which also includes the control safety assembly 40 which includes the caster wheel 61, the truck axle 62, and gear box 63, as well as the engagement bar 64 discussed infra; and also see FIG. 2. The central DRS does not have a cross member 14 there beneath. Rather there are cross members 14 on either side of the central DRS, and the 2 cross members 14 C and D are L beams that face each other and receive an expanded metal surface to serve as a catwalk for maintenance, help in removal of decking sheets and other purposes. As per FIG. 8 these two cross members 14C and 14D extend forwardly beyond the front superstructure member 12, either as one piece each or as two parts as may be desired for each of the two cross members. A front plate 16 connects the forward ends of 14C and 14D. The expanded metal conventional cat walk surface 80 lies between 14C and 14D, and L-plates 12 and 11. While expanded metal 800 is a small square of the same material as 80 between front base 12 and front plate 16 is designated 800. There is a similar area of expanded metal on the opposite side of the engine 85 not fully visible in FIG. 8. Note from FIG. 8 that the central DRS has no inclined support 17 and no cross member 14. An upstanding post mounted to an inverted u support 19 disposed at about the middle of the expanded metal. See FIG. 2. Engine 85 seen in FIG. 2 will be discussed infra.

Figure 7:
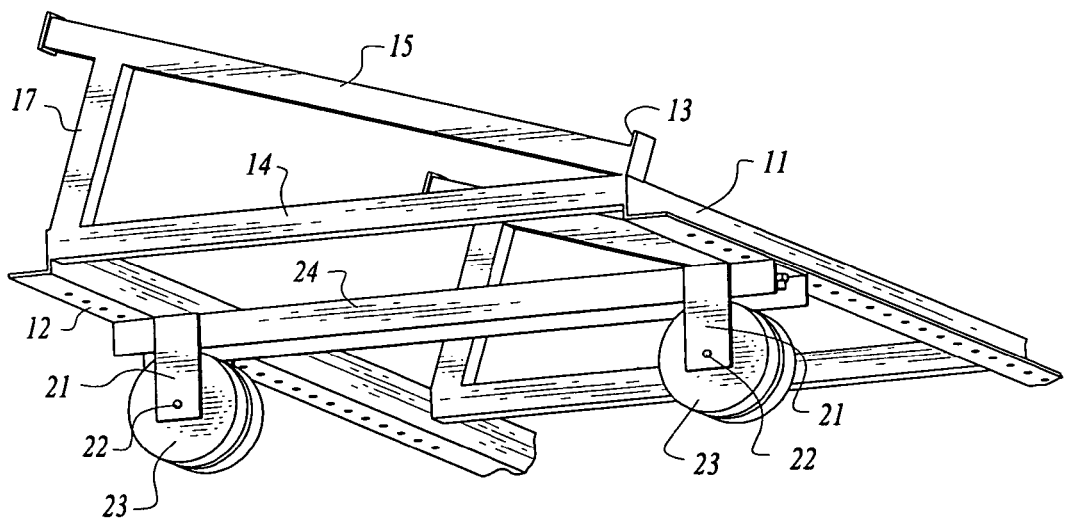
FIG. 7 is a bottom perspective view of a portion of this invention.

Axle assembly 20 seen in FIG. 1 located between the first 2 and last 2 of the DRSs are seen be an inverted U-channel 24 per FIG. 7 with depending downward side plates 21 through which pass an axle 22 carrying a pair of tandem casters 23.

Also seen in FIG. 9 to the rear of the engine 85 is the truss guide assembly 51, also to be discussed infra. The distance between 15A and 15B is about 5 ft. 6 in. This is the distance also between cross bar and 14C, which serves also as the support for the expanded metal decking. The expanse from the right side 14 F is the same 11 feet to the other decking support 14D. The distance between each channel 14C and the center of the inverted U support 19 is about 1 foot 1 inch as is the distance to 14D also about 1 ft 1 in. Of course spans between members, larger and smaller are contemplated and as such fall within the scope of the invention. The distances recited have been found to give good support to bundles of decking sheets about 32 feet long. While the spacing between the outer casters is about 16 feet, the entire span of the unit is about 22 feet long, but longer units are contemplated for larger decking sheets as the need may arise. See also FIG. 28 where a typical bundle of decking is seen in perspective.

Figure 4:
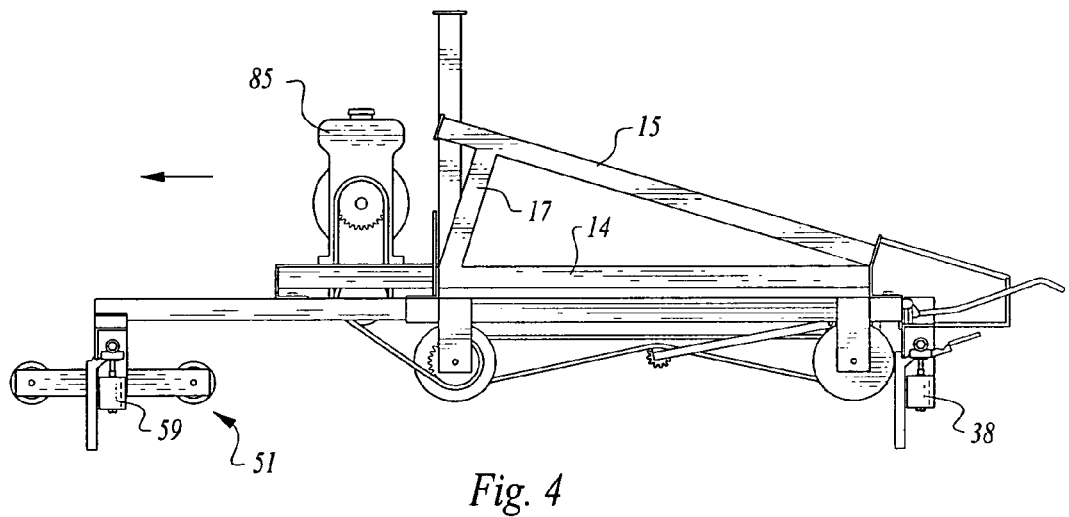
FIG. 4 is a left end elevational view of the apparatus.

We turn now to FIG. 3, which is a sectional view taken at the right end of the apparatus as seen from the rear which is the operational end of the apparatus. The side plates 21 are seen to have the axle aforementioned carrying the tandem casters. A single bolt unnumbered connects the cross member 14 to the inverted U channel there beneath at each end. For ease and convenience of the reader no numbers will be assigned to nuts and bolts used to connect parts together. The expanse of each of the DRSs is about 3 ft 6 inches to accommodate different width decking sheets. FIG. 4 is a image related to the sectional view of FIG. 3 but is taken from the left end of the apparatus. One element 13 is seen here, and a specific element 13, namely 13B is depicted in FIG. 1. A Guide roller assembly 38, similar to guide roller assembly 59,—discussed below—is seen at the opposite end of the apparatus 10.

Figure 5:
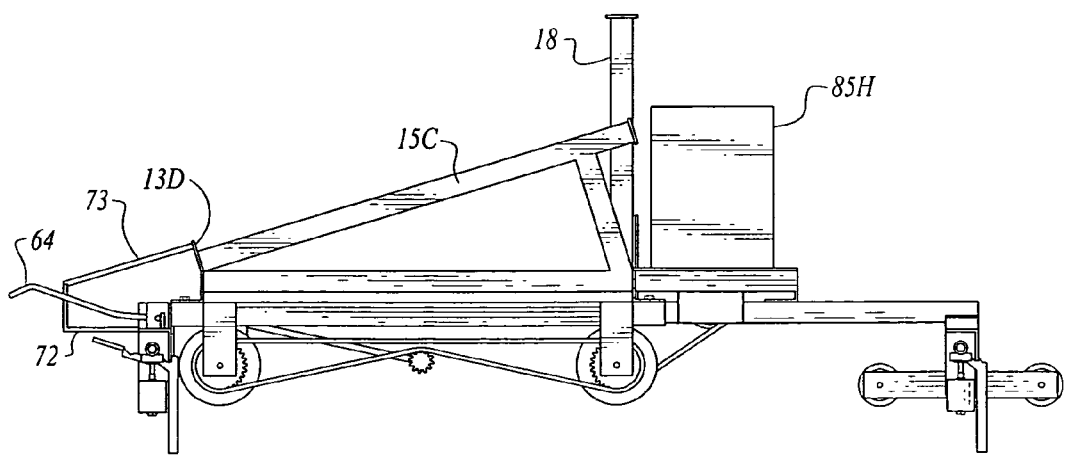
FIG. 5 is a center sectional view thereof.

FIG. 5 is a center sectional view taken from the right side of the apparatus looking to the center. As noted earlier there is no inclined member in the center as DRS 13C is attached to the upstanding post 80. See also FIG. 8. Whereas in FIG. 8 the engine 85 is open to the air, in this view the engine is enclosed in a housing, 85H. The engagement bar 64 of control safety assembly 40, is used to urge the apparatus forward at its fantastic speed of less that 1 mph is seen in its up or non-actuated position in FIG. 6, and down (operative) in FIG. 5. More details on this and the other components that are complimentary thereto will be discussed infra. Also seen in this view is connector bar 73 that runs between the face of the rest 13D opposite from DRS 15C to a tilted 7 shape bar. This triangle formed of these two elements serves as an extra rest site, so that as sheets of decking are moved off the bundle, they slide down without hitting or damaging the throttle 64. See FIGS. 11 & 19.

Figure 6:
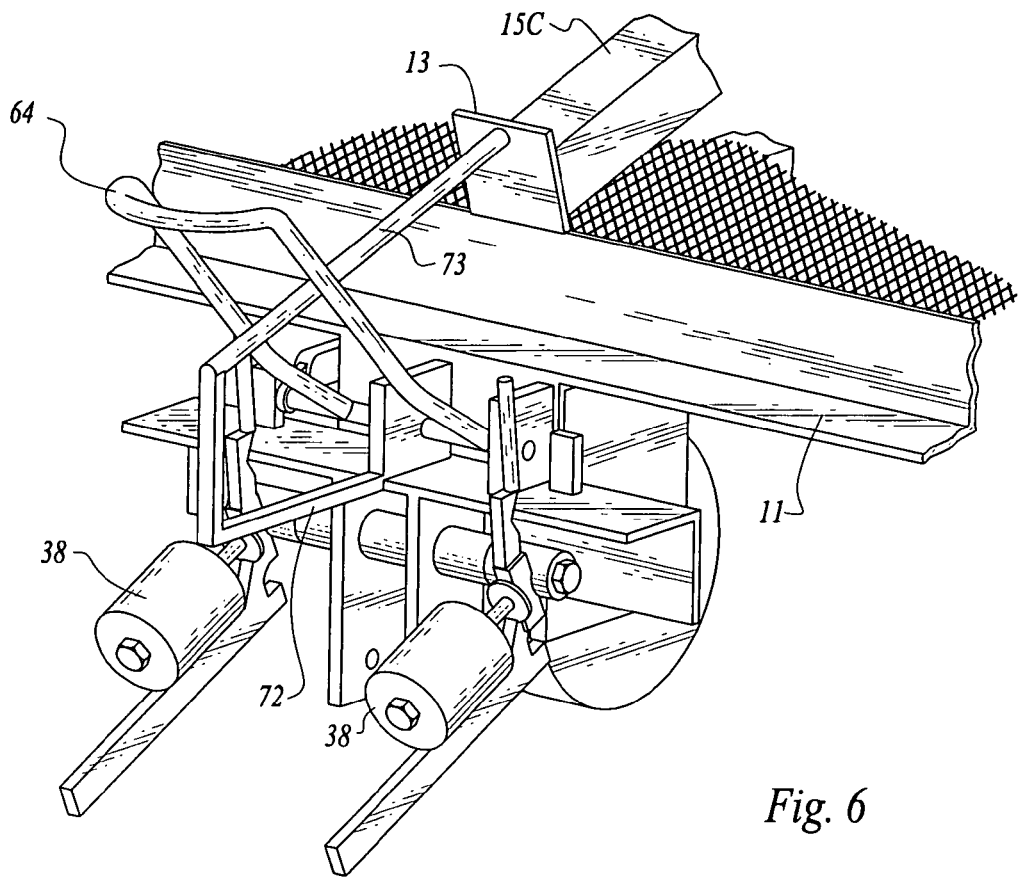
FIG. 6 is a rear center perspective view of a portion of this invention.

FIG. 6 is a front center closeup view with the front guides in the up position, and the actuator in up position.

In FIG. 7, part of the invention 09's superstructure 10 is seen, Opposed L-beams 11 and 12 and a cross bar 14 welded or otherwise attached, is seen, in addition to stop 13 which is welded or other wise attached to both the cross bar and the L-beam 11 and to the DRS 15. One of the two inverted U-channels 24 is seen attached on the underside of the two L-beams, at a right angle to each. Depending down spaced in from the ends of the U-channel 24 are spaced side plates 21 at opposite ends of the U-channel and aligned opposite and spaced from each other at both the front and rear of the apparatus. The location of said plates is slightly inward from the inner edge of the horizontal section of each L-beam. A pin 22 passes through each opposed pair of side plates and is retained therein. Each pin 22 carries a tandem pair of casters, which are preferably about 5 inches in diameter. The caster assembly seen in FIG. 7 is the left such unit. The right such unit is a duplicate of the unit just described.

Seen in FIG. 9 this view is the front truss guide assembly 51 attached to spaced tubes 50. By guide plate 52. Front truss guide assembly is disposed forward of the front L-beam 12, while the rear truss guide assembly is disposed rearward of the rear L-beam 11. Since the details of each are the same, only the rear truss guide assembly will be discussed in detail.

Turning now to FIGS. 8 &9, where the front truss guide 51 is seen. A pair of spaced pipes 50 are retained by pipe clamps 53 to an inverted L-shaped guide plate 52. A pair of spaced side plates 54 close off the opening beneath the inverted L by depending down from the horizontal portion thereof. A pin 56 extends through a suitable unmarked opening in each of the two spaced side plates 54 and is retained therein. A notched pivot bar 55 having a notch 55N is attached on each outer extremity of the pin. Attached to the two pivot bars is a rotatable guide roller 59 attached to the pivot bar 55 by a guide mount 60. If the guide bar is manually pivoted upwardly and outwardly, the roller will move from its vertical orientation to a horizontal position. And can be locked into a fixed position. Note from FIG. 9 a duplicate of this guide roller arrangement is spaced from the one in view. Though the second one is partially hidden in both FIGS. 8 & 9.

Disposed between the two vertical plates 54 beneath the horizontal surface of inverted L-plate 52 are a pair of spaced and aligned truck frames 57. At each end is a truck 58, which appears similar to the wheels found on railroad car, and which are called trucks. The trucks are each retained in position on a suitably mounted axle 62. Note that there are not two trucks back to back, at each end of the front truss guide assembly. It is just one truck with two similar faces. See FIG. 25. These trucks act as containment wheels.

If the front truck hits an impediment it will tilt and ride over the impediment on the groove of the truss while the rear truck of this front guide will stay in the slot of the truss. If the guide bar, 55, which in it's normal operating position is downward, hits an impediment such as the framing for a skylight, it will tilt rearwardly, and cause the guide wheel to move upward to a temporary horizontal disposition, until the impediment has been passed by the guide bar 55. The truck rides within a groove down the middle of the roof truss. See FIG. 25.

Let us return now to FIG. 8 and the other aspects of this FIGURE. The expanded metal decking 80 & 800 has already been discussed. The decking serves as a platform for workers to access the engine safely or to access the deadman's switch 130 to kill the engine, should the engagement bar 64 fail to function. The emergency kill switch is mounted on upstanding post 18 which is supported by undercarriage 88. More on the undercarriage at the point of discussion of the transmission. Line 131 is the power line from the actuator 64 and serves as a deadman's line so that there is no power when the actuator is in the off position.

Note the large gas tank sitting on top of the engine 85. While a gas powered engine is seen here, the use of a hydraulic prime mover, a pneumatic prime mover, diesel and electric motors are also contemplated as suitable for this invention. The gasoline engine 85 is a 5.5 horsepower off the shelf Honda 4 cycle engine.

Sign 133 may be mounted on the front part of the apparatus 09 in any conventional manner. It can be used for advertising as well as trademark and patent marking.

Figure 21:
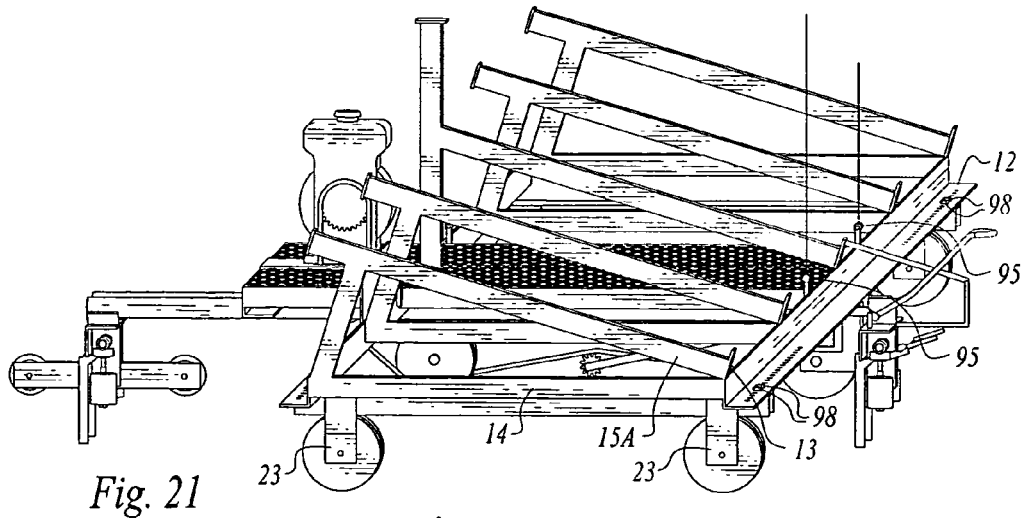
FIG. 21 is a top left end perspective view of this invention.
Figure 22:
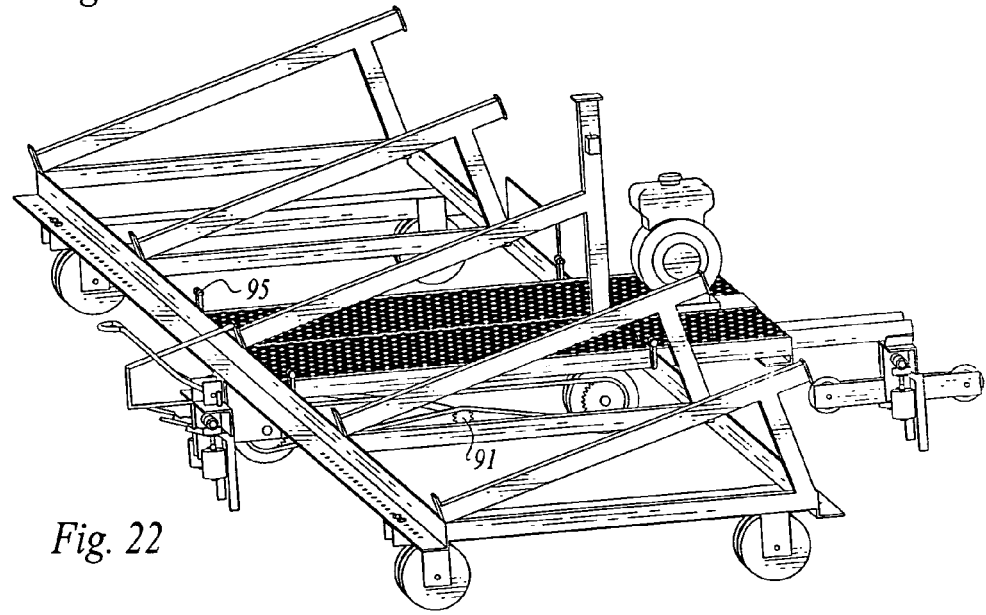
FIG. 22 is a top right end perspective view of the apparatus.

Tucked away near the far front right on beam 12 is one or more standoffs or cable attachment points such as clevis 95—seen in FIG. 8, which can be used by the crane operator to attach his cables when the cart 09 is to be redeployed. See also FIGS. 21 & 22.

Figure 10:
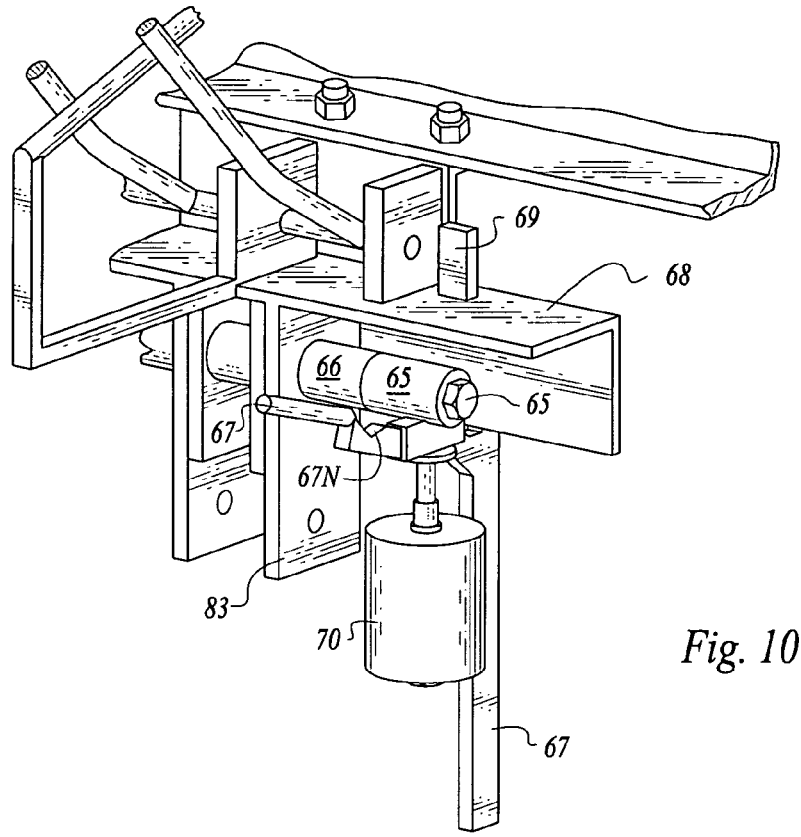
FIG. 10 is a closeup view of the rear guide roller in the down position.
Figure 11:
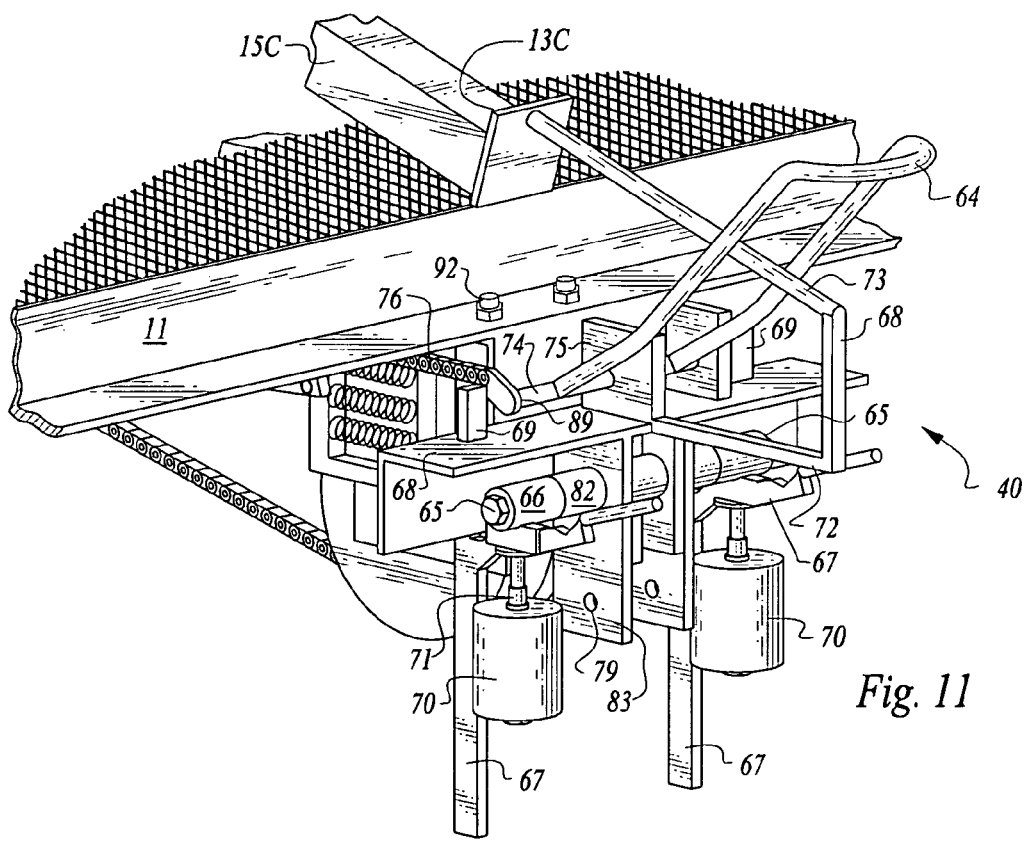
FIG. 11 is a top rear perspective view of the central portion of the inventive apparatus.

The discussion now moves to the rear of the apparatus. FIG. 10 illustrates the rear guide from a different perspective. No further discussion is needed as this item has been discussed supra. Now reference is made to FIGS. 11 and 12. FIG. 12 is a closer view of elements of FIG. 1, but from a slightly different vantage point. Thus in FIG. 11, one sees a portion of the center DSR 15C, and its rest 13C, which is attached thereto and to rear beam 11. A downwardly depending tube 73 connects to an upward facing 7 shaped bar 72 which in turn is secured to an rear inverted L bracket 68. The purpose of parts 73 and 72 are to protect the throttle (aka the engagement bar) 64 from damage when in the down position. Note the disposition of tube 73 in the middle of the space between the two arms of throttle 64. The move forward position for the throttle 64 is down while the at rest position for unloading decking sheets is up. The up position is seen in FIGS. 11,12,& 13.

As seen better in FIG. 12, engagement bar 64 is welded or otherwise attached to rotating pin 74 disposed in a pair of spaced plates. At each end of the pin is an angled plate 77 sitting at about a 45 to 60 degree angle upwardly and forwardly. Attached to the top of the angled plate is a bike chain attached to the transmission seen here in part but discussed infra.

Figure 19:
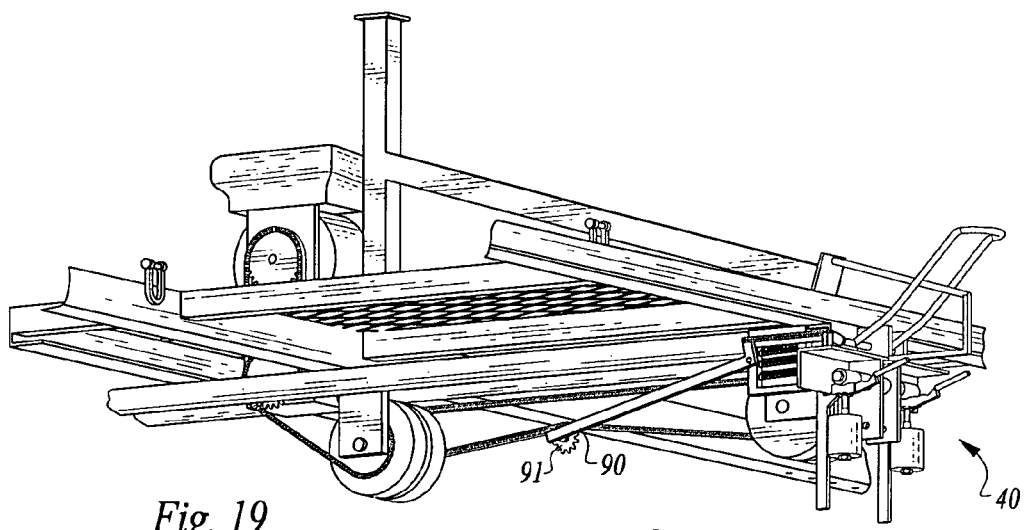
FIG. 19 is a bottom perspective view of the center portion of this apparatus.
Figure 20:
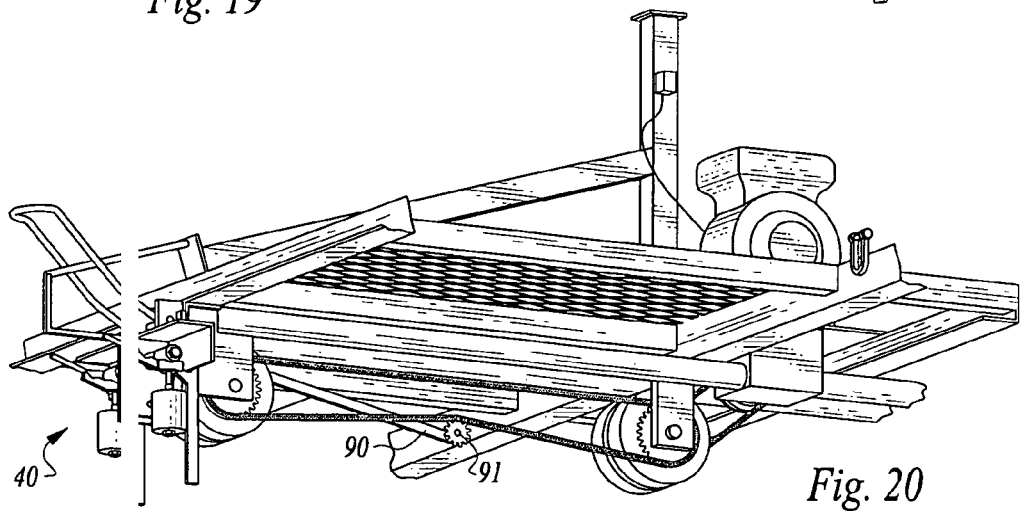
FIG. 20 is a view similar to FIG. 19 but from another vantage point.

Bar 64 is seen in its non-operative position. When the engagement bar is pulled down, the plate 77 rotates from it 10 PM facing position, to a 1 or 2 o'clock position. This movement tugs on the bike chain 76 to engage a clutch not seen, that meshes the transmission 93 with the engine 85 to start the engine to create forward movement. As seen in FIG. 19, a downwardly and forwardly disposed bar 90 is attached to the undercarriage and has a chain tensioner 91 thereon, which tensioner's sprockets engages the bike chain to keep it from going slack, which would interfere with the operation of the apparatus. See also FIGS. 20 and 24.

Returning to FIG. 12, the plate 75 is upstanding and is welded or otherwise attached to reverse 7 positioned L-bracket 68. Bracket 68 has an upstanding bent portion 69 at each end uniformly spaced in from the outside edges. See FIG. 12. Disposed on both sides of support 72 are a pair of small vertical plates 78 each with a throughbore 79. These vertical plates, are best seen in FIG. 11.

Lock arm 67 is attached to a sleeve 82 which rotates around pin 65 held in position by pin mount 66 attached to the underside of the aforementioned bracket 68, and by pin plate 83 1:3 attached to the underside of reverse 7 L-bracket 68. The arm 67 has a notch therein 67N which can engage the upstanding bent portion a.k.a. stop 69. Guides 70, attached by rear guide mounts 71 are normally in a vertical disposition, will move to a horizontal position when lock arm 67 is raised for its notch 67N to engage stop 69.

A pair of bolts and nuts together designated 92 disposed on the upper surface of rear base 11 connects the undercarriage to the frame which is attached to the underside of base 11. Reference is also FIG. 13, which is a right side view of this same area. Clevis 95 has a lifting cable as from a crane or other carrier attached thereto in this FIGURE.

In FIGS. 8 & 9, the truss guide assembly is seen in a side view and was discussed in detail. But in FIG. 14, one can better see the pivotal mounting of the truck frame 57 since the rear of the two trucks 58 mounted between the 2 truck frames 57 is up while the front unit is down relative to the rear truck. Here one of the two side plates 54 is seen as is the contour of the leading truck, IE., beveled on both sides of the center area, unlike a railroad car truck.

In FIG. 23, note the direction of MOTION arrow. All elements visible in this view have been discussed elsewhere herein. Twin casters 23 are seen here as well as in other views.

In FIGS. 8 & 9, the lead guide roller 59 and its pivot bar 55 are seen in the down position which is the normal position when stationary or in motion. But as mentioned earlier when an impediment is encountered by the pivot bar 55 move rearwardly and upwardly. In FIG. 15, a view taken at a moment in time when the arm is partially up as is the roller. Contrast this view with FIG. 16, where these two elements have rotated a full 90 degrees.

FIG. 17 is a closeup view of a hitch point or clevis 95 used by a crane as an attachment point for the relocation of the apparatus either to or from a rooftop. These are conventional off the shelf items available at any hardware store.

Figure 24:
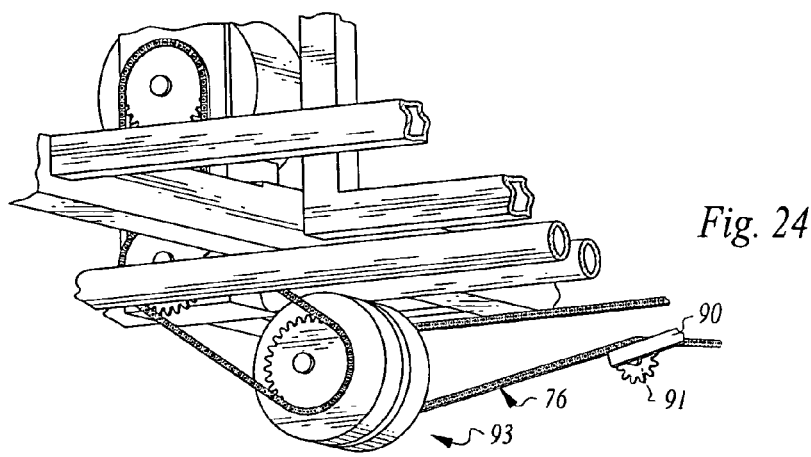
FIG. 24 is a bottom perspective view showing the transmission connected to the bike chain.

FIG. 24 is a bottom view showing the transmission, 93—conventional—and the bike chain connected thereto via a conventional clutch not seen. The chain is connected to the actuator, as discussed infra.

FIG. 25 is a front view showing a truck 58 disposed within the slot or groove 98 of a roof truss 97. Since the truck can not wobble off course as it rides in the groove, it tends to keep the apparatus on a straight course.

Figure 18:
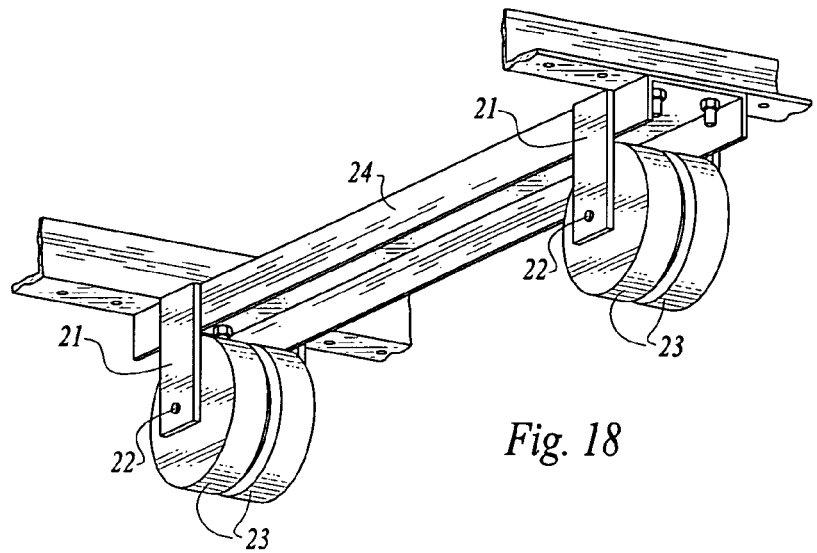
FIG. 18 is a bottom perspective view of the left wheel assembly of this invention.

In FIG. 26 we see closeup certain elements seen in FIG. 18. Mounted on post 18 is the power cable 131, that goes through the toggle switch 132. In an emergency an operator can get onto the catwalk, either 80 or 800 and flip the toggle switch 132 to immediately kill the engine 85, which sits on the engine support 84, per FIG. 8 and thus stop forward progress of the apparatus.

Now that the apparatus of this invention has been fully discussed, it is important for the reader to put the apparatus into perspective with respect to a large (150,000 sq ft of roofing). Thus in FIG. 27 a single roof truss 120 is seen. This roof truss forms no part of the 2.3 invention, but is present for explanatory purposes only. Such roof trusses are readily available in the marketplace at varying lengths.

Figure 28:
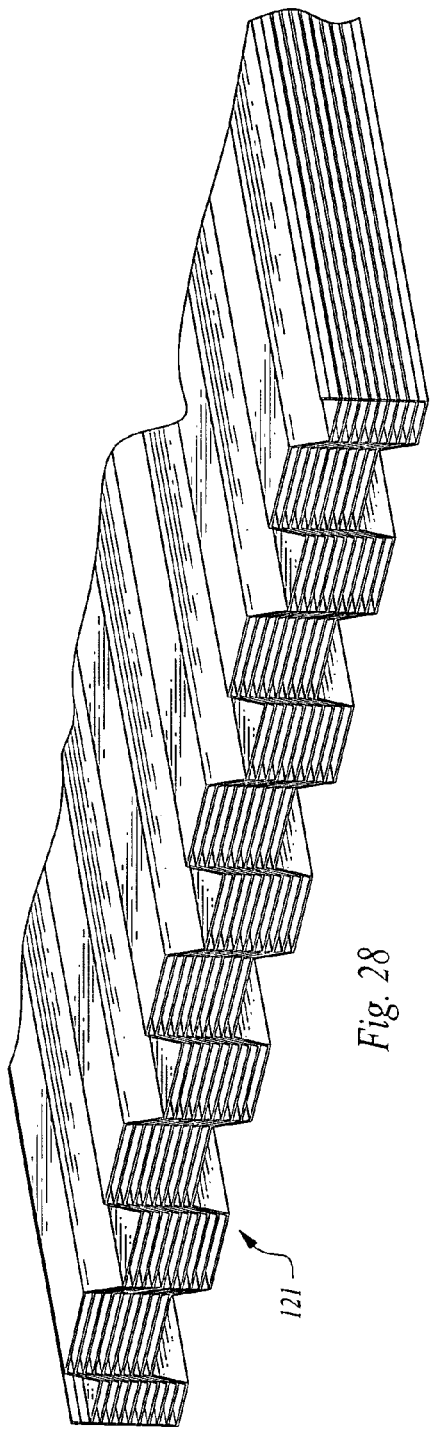
FIG. 28 is a perspective view of a bundle of sheets of the roof decking referred to in this patent application, but not forming a part of the invention.

In FIG. 28, a typical bundle of 12 sheets of decking, designated 121 can be seen. Note the presence of 6 peak flat areas and 5 valley flat areas, in each sheet.

In FIG. 29, 2 men are seen in the act of unloading one sheet of decking from on top of the bundle of decking. One man is at each end of the street 122, stopped at a moment in time by the camera shutter.

Figure 31:
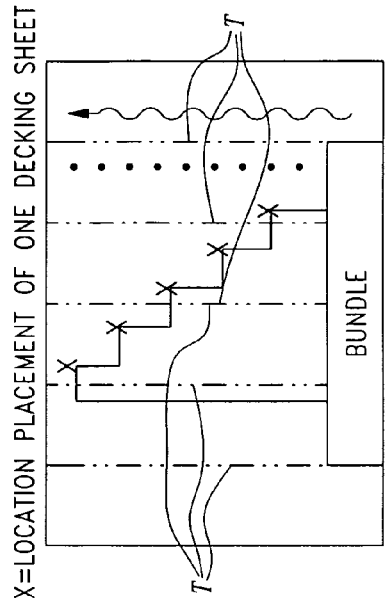
FIG. 31 is a similar diagrammatic view showing the reduced walking pattern of a worker who installs decking removed from the apparatus of this invention.
Figure 30:
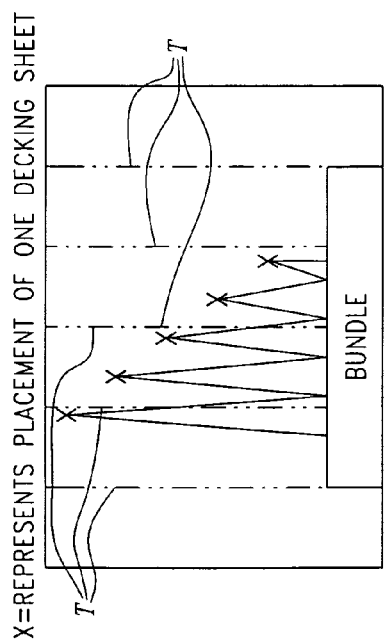
FIG. 30 is a diagrammatic view showing the walk pattern of a worker who installs decking, using the current conventional mode of decking sheet placement.

FIGS. 30 & 31 represent a diagrammatic top view of the roof of the same building with a spaced series of trusses, wherein the location of the edge of a placed decking sheet is shown by a dot, such that 6 sheets are placed from front to back along 3 trusses. The top curve in FIG. 30 which is zig-zagged shows a constant repetition of walking back to the stack of deck sheets, the movement to the second location along the trio of trusses, then to the third location along the trio of trusses, ad infinitum until all 6 sheets have been placed. This is a lot of back and forth walking. In FIG. 30, "T" with the down arrow represents the location of one truss of 6 to 10 feet apart. The dots represent the location of a sheet of decking, placed 90 degrees to the length of the truss.

But in the other curve which is a stepped curve, and the T arrow and the dot series have the same meaning as in FIG. 31. It is readily seen that the worker goes forward, forward in 6 increments and only returns one time, when the trio of trusses has been covered, and the workers must move such that the crane can relocate the cart of this invention to the next trio of trusses. The wavy line is to signify the forward straight ahead path of the movement of the cart. A wavy line was used to avoid confusion with the small arrow associated with the designator lines associated with the T.

This is a very significant savings of time and energy for the workers involved.

CONCLUSION

As can be seen from the comparison of the walk patterns as seen in FIGS. 30 and 31, significant steps and time are saved in the placement of a bundle of sheets of steel or other metal roof decking, when the mobile cart of this invention is employed by the workers. This saving of steps and time translates into cost savings on the roof aspect of a large building, especially when the usually 12 sheets are multiplied 200 or 1000 times, for a full building roof. When one does the math and factors in the cost of leasing the machine and adds that to the labor cost of time sent by the workers on the roof, there is a significant cost savings falling to the contractor who uses the cart. It is seen therefore that the invention of this application reduces job labor costs. It is also much safer and reduces the negative physical damage to the workers.

Since certain changes may be made in the above described apparatus without departing from the scope of the invention herein involved, it is intended that matter contained in the above description and shown in the accompanying drawings shall be interpreted as illustrative and not in a limiting sense.

I claim:

1. A cart, for carrying a bundle of sheet roof decking, for removal by workers of individual sheets for the installation of said sheets on trusses of large commercial buildings, which cart comprises:
    (A) a base having spaced front and rear members, and cross members spaced at intervals, attached normally to said front and rear members;
    (B) two laterally spaced inverted U-channels attached beneath said base to said front and rear members, each inverted U-channel carrying at least two axles with casters theron;
    {C) each cross member having an inclined deck sheeting receiver—(DRS)—attached thereto with a stop rest at the lower end of each DRS except for the central DRS;
    (D) a controllable prime mover connected to a transmission to permit the cart to move forward at an extremely slow speed;
    (E) a front truss guide assembly to ensure straight line travel of the cart,
    (F) an actuator for said prime mover.

2. The cart of claim 1 further including a catwalk running between the front and rear members.

3. The cart of claim 1 wherein the truss guide assembly comprises a pair of spaced truck frames having two spaced axles with a truck mounted on each axle.

4. The cart of claim 1 wherein for the two laterally spaced inverted U-channels attached beneath said base to said front and rear members, each U-channel has a spaced pair of aligned downwardly depending side plates per side of said U-channel, an axle disposed through each pair of opposed side plates, each axle carrying at least one caster.

5. The cart of claim 3 wherein the truss guide assembly further includes a mirror image mounted guide roller mounted outwardly from each of the truck frames.

6. In the cart of claim 5 wherein each guide roller further includes lockable raising means to move the roller to a generally horizontal position.

7. The cart of claim 1 wherein the prime mover is a gasoline engine.

8. In the cart of claim 1 further including a pair of rear spaced guide rollers spaced from the actuator for the prime mover.

9. In the cart of claim 8 wherein each guide roller further includes lockable raising means to move the roller to a generally horizontal position.

10. A cart, for carrying a bundle of sheet roof decking, for removal by workers of individual sheets for the installation of said sheets on trusses of large commercial buildings, which cart comprises:
    (A) a base having spaced front and rear members, and cross members spaced at intervals, attached normally to said front and rear members;
    (B) two laterally spaced inverted U-channels attached beneath said base to said front and rear members, each inverted U-channel carrying at least two axles with casters thereon;

{C} all cross members except a central cross member having an inclined deck sheeting receiver—(DRS)—attached thereto with a stop rest at the lower end of each DRS; and a central inclined deck receiver-(DRS) having a stop rest at its lower end;

(D) a controllable prime mover connected to a transmission to permit the cart to move forward at an extremely slow speed;

(E) a front truss guide assembly to ensure straight line travel of the cart, (F) an actuator for said prime mover;

wherein the truss guide assembly comprises a pair of spaced truck frames having two spaced axles with a truck mounted on each axle and wherein the truss guide assembly further includes a mirror image mounted guide roller mounted outwardly from each of the truck frames.

11. The cart of claim 10 further including a pair of rear spaced guide rollers spaced from the actuator for the prime mover and each guide roller further includes lockable raising means to move the roller to a generally horizontal position.

12. The cart of claim 1 further including a pole mounted emergency on-off switch.

13. The apparatus of claim 10 wherein there are 5 DRSs each mounted at about a 17 degree angle.

14. A cart, for carrying a bundle of sheet roof decking, for removal by workers of individual sheets for the installation of said sheets on trusses of large commercial buildings, which cart comprises:

(A) a base having spaced front and rear members, and cross members spaced at intervals, attached normally to said front and rear members;

(B) two laterally spaced inverted U-channels attached beneath said base to said front and rear members, each inverted U-channel carrying at least two axles with casters theron;

{C} each cross member having an inclined deck sheeting receiver—(DRS) except for a central DRS which is not attached to a cross member each DRS having attached thereto a stop rest at the lower end of each DRS, plus a central DRS with a stop rest, said central DRS also having a forward end mounted to a vertical post;

(D) a controllable prime mover connected to a transmission to permit the cart to move forward at an extremely slow speed;

(E) a front truss guide assembly to ensure straight line travel of the cart, (F) an actuator from said prime mover;

wherein the front truss guide assembly comprises a pair of spaced truck frames having two spaced axles with a truck mounted on each axle and wherein the truss guide assembly further includes a mirror image mounted guide roller mounted outwardly from each of the truck frames;

(G) an emergency kill switch disposed on said vertical post and;

(H) including a catwalk running between the front and rear members.

15. The cart of claim 14 further including a pair of rear spaced guide rollers spaced from the actuator for the prime mover and each guide roller further includes lockable raising means to move the roller to a generally horizontal position.

* * * * *